(12) United States Patent
Robb

(10) Patent No.: US 10,757,858 B2
(45) Date of Patent: Sep. 1, 2020

(54) BUSH HOG CUTTING AND THRESHING BLADE

(71) Applicant: Drew Robb, Columbia, SC (US)

(72) Inventor: Drew Robb, Columbia, SC (US)

( * ) Notice: Subject to any disclaimer, the term of this patent is extended or adjusted under 35 U.S.C. 154(b) by 254 days.

(21) Appl. No.: 15/925,147

(22) Filed: Mar. 19, 2018

(65) Prior Publication Data

US 2019/0069479 A1    Mar. 7, 2019

Related U.S. Application Data

(60) Provisional application No. 62/553,540, filed on Sep. 1, 2017.

(51) Int. Cl.

| | | |
|---|---|---|
| *A01D 34/73* | (2006.01) | |
| *A01D 34/82* | (2006.01) | |
| *A01D 34/835* | (2006.01) | |
| *A01F 12/18* | (2006.01) | |
| *A01K 39/00* | (2006.01) | |
| *A01F 7/04* | (2006.01) | |
| *A01F 7/70* | (2010.01) | |
| *A01D 41/00* | (2006.01) | |

(52) U.S. Cl.
CPC ............ *A01D 34/73* (2013.01); *A01D 34/736* (2013.01); *A01D 34/82* (2013.01); *A01D 34/835* (2013.01); *A01D 41/00* (2013.01); *A01F 7/04* (2013.01); *A01F 7/70* (2013.01); *A01F 12/18* (2013.01); *A01K 39/00* (2013.01); *A01K 2227/30* (2013.01)

(58) Field of Classification Search
CPC ...... A01D 34/73; A01D 34/736; A01D 41/00; A01D 34/82; A01D 34/835; A01F 7/70; A01F 12/18; A01F 7/04; A01K 39/00; A01K 2227/30; Y10S 56/17; Y10S 56/20; B26D 1/29
USPC ................... D8/20; D15/17; 56/225; 30/276
See application file for complete search history.

(56) References Cited

U.S. PATENT DOCUMENTS

| | | | | |
|---|---|---|---|---|
| 2,869,311 | A * | 1/1959 | Beeston, Jr. | A01D 34/73 56/295 |
| 3,068,633 | A * | 12/1962 | Taylor | A01D 34/733 56/295 |
| 3,080,697 | A * | 3/1963 | Mauro | A01D 34/73 56/295 |
| 3,103,093 | A * | 9/1963 | House, Jr. | A01D 34/736 56/295 |
| 3,636,685 | A * | 1/1972 | Speckman | A01D 34/73 56/295 |

(Continued)

*Primary Examiner* — Arpad Fabian-Kovacs
(74) *Attorney, Agent, or Firm* — F. Rhett Brockington

(57) ABSTRACT

A cutting and threshing blade for a bush hog, wherein the blade has a trailing edge and a leading edge. At least a third of the leading edge of the upper-side of an elongate distal portion of the blade has a knife edge with a knife length that thickens toward the trailing edge. The trailing edge can have an upward air deflector. The bottom-side of the elongate distal portion has a threshing element, which includes a threshing block, which is a steel block having a block length that is comparable to the knife length and projects downward and substantially parallel to the knife edge. The rotating blades pummel growth carriers (i.e.; cob, husk) bearing seeds, grains, and kernels with enough force that they are released. The synergistic rotating knife edge and threshing block transform the bush hogging process from a cutting process to a cutting and threshing process.

16 Claims, 6 Drawing Sheets

(56) References Cited

U.S. PATENT DOCUMENTS

| | | | | |
|---|---|---|---|---|
| 3,665,692 A * | 5/1972 | Hughes | A01D 34/63 | 56/295 |
| 3,762,138 A * | 10/1973 | Michael | A01D 34/733 | 56/295 |
| 3,769,784 A * | 11/1973 | Jones | A01D 34/73 | 56/295 |
| 3,780,509 A * | 12/1973 | Woelffer | A01D 34/73 | 56/295 |
| 3,982,337 A * | 9/1976 | Garriott | E01H 5/04 | 37/233 |
| 4,053,112 A | 10/1977 | Vander Heeren et al. | | |
| 4,214,426 A * | 7/1980 | Lindblad | A01D 34/826 | 56/17.5 |
| 4,297,831 A * | 11/1981 | Pioch | A01D 34/826 | 56/295 |
| 4,320,617 A * | 3/1982 | Fedeli | A01D 34/73 | 56/13.4 |
| 4,651,510 A * | 3/1987 | Malutich | A01D 34/733 | 56/13.4 |
| 4,779,407 A * | 10/1988 | Pattee | A01D 34/73 | 56/295 |
| 4,995,228 A * | 2/1991 | Hladik, Jr. | A01D 34/73 | 56/255 |
| 5,018,347 A * | 5/1991 | Feilen | A01D 34/733 | 30/335 |
| 5,036,654 A * | 8/1991 | Malutich | A01D 34/733 | 56/255 |
| 5,109,656 A * | 5/1992 | Zimmer | A01D 34/73 | 56/17.5 |
| 5,303,535 A * | 4/1994 | Smith | A01D 34/733 | 56/255 |
| 5,327,710 A * | 7/1994 | Plamper | A01D 34/005 | 56/255 |
| 5,357,738 A * | 10/1994 | Griffiths | A01D 34/005 | 56/17.5 |
| 5,383,329 A * | 1/1995 | Cornell, III | A01D 34/73 | 56/255 |
| D357,691 S * | 4/1995 | Bryant | D15/17 | |
| 5,457,947 A * | 10/1995 | Samejima | A01D 34/005 | 56/16.7 |
| 5,626,007 A * | 5/1997 | Harrington | A01D 34/66 | 56/13.5 |
| 5,669,213 A * | 9/1997 | Britton | A01D 34/005 | 56/17.5 |
| 5,673,545 A * | 10/1997 | Friesen | A01D 34/535 | 56/255 |
| 5,761,891 A * | 6/1998 | Ferrari | A01D 43/077 | 56/17.5 |
| 5,809,765 A | 9/1998 | Hastings et al. | | |
| 6,145,290 A * | 11/2000 | Sullivan | A01D 34/005 | 56/17.5 |
| 6,182,430 B1 * | 2/2001 | Blarek | A01D 34/73 | 56/17.5 |
| 6,301,868 B1 * | 10/2001 | Siplinger | A01D 34/73 | 56/255 |
| 6,415,591 B1 * | 7/2002 | Tylka, Sr. | A01D 34/73 | 56/255 |
| 6,487,840 B1 * | 12/2002 | Turner | A01D 34/005 | 56/295 |
| 6,594,981 B2 * | 7/2003 | Troger | A01D 34/005 | 56/255 |
| D487,098 S * | 2/2004 | Arfstrom | D15/17 | |
| 7,024,847 B2 * | 4/2006 | Hartley | A01D 42/005 | 56/255 |
| 7,448,194 B2 * | 11/2008 | Koike | A01D 34/71 | 56/320.1 |
| 7,784,255 B2 | 8/2010 | Moore, Jr. et al. | | |
| 8,099,937 B2 * | 1/2012 | Lindmeyer | A01D 34/73 | 56/255 |
| D766,332 S * | 9/2016 | Poole | D15/17 | |
| 9,480,200 B1 * | 11/2016 | Patridge | A01D 34/005 | |
| 9,901,029 B2 * | 2/2018 | Wills | A01D 34/733 | |
| D812,443 S * | 3/2018 | Gonzalez | D8/20 | |
| 2003/0221404 A1 * | 12/2003 | Hancock | A01D 34/73 | 56/255 |
| 2004/0187463 A1 * | 9/2004 | Eddy | A01D 34/73 | 56/295 |
| 2007/0163124 A1 * | 7/2007 | Kenny | A01D 34/73 | 30/165 |
| 2013/0212995 A1 * | 8/2013 | Ebihara | A01D 34/667 | 56/10.5 |
| 2015/0047308 A1 * | 2/2015 | Schreiner | A01D 34/73 | 56/10.1 |
| 2015/0271998 A1 * | 10/2015 | Kurioka | A01D 34/68 | 56/255 |
| 2015/0359171 A1 * | 12/2015 | Butler | A01D 34/73 | 56/295 |
| 2018/0064027 A1 * | 3/2018 | Gonzalez | A01D 34/52 | |

* cited by examiner

BUSH HOG CUTTING AND THRESHING BLADE

CROSS-REFERENCES TO RELATED APPLICATIONS

The present patent application/patent claims the benefit of priority of U.S. Provisional Patent Application No. 62/553,540, filed on Sep. 1, 2017, and entitled "Bush Hog Cutting and Threshing Blade", the contents of which are incorporated in full by reference herein.

BACKGROUND OF THE INVENTION

1. Field of the Invention

The present invention relates to bush hogs blades for cutting, and more particularly to bush hog blades for cutting and threshing, wherein a bush hog fitted with cutting and threshing blades separates seeds and grains from a growth carrier, therein making a crop a more palatable source of food for game birds in general, and doves in particular.

2. Background

A bush hog fitted with conventional cutting blades is frequently used to mow a field of a crop selected from corn, wheat, milo, sorghum, millet, sunflower, and buckwheat to attract game birds, and most frequently, doves. The mowed field is safer for hunting, as hunters can see each other, and, as discussed below, there are a number of factors to consider, including what is lawful, and what is unlawful. Conventional bush hog cutting blades efficiently cut the crop, but leave the seeds and grains largely intact attached to the growth carriers (i.e., cob and other cereal husks). In this form many game birds and dove in particular are not predisposed to eat seeds that are still retained in growth carriers, and in general less game will be in the field. It is recognized that more game will likely be present if the field has loose seeds and grains, however as will become abundantly clear, providing loose seeds and grains should be carefully considered in light of local, state and federal laws.

Mourning doves and other migratory birds are a national resource protected under the Migratory Bird Treaty Act (Title 50, Code of Federal Regulations, Part 20.11). The mourning dove is the most hunted migratory game bird in North America, and dove hunting is a popular sport in many parts of the United States. Federal and State regulations help ensure that these birds continue to thrive while providing hunting opportunities.

A baited area is defined as any area on which salt, grain, or other feed has been placed, exposed, deposited, distributed, or scattered, if that salt, grain, or other feed could serve as a lure or an attraction for migratory game birds to, on, or over areas where hunters are attempting to take them. Any such area will remain a baited area for 10 days following the complete removal of all such salt, grain, or other feed.

Baiting is defined as the direct or indirect placing, exposing, depositing, distributing, or scattering of salt, grain, or other feed that could serve as a lure or attraction for migratory game birds to, on, or over any areas where hunters are attempting to take them.

Manipulation is defined as the alteration of natural vegetation or agricultural crops by activities that include but are not limited to mowing, shredding, discing, rolling, chopping, trampling, flattening, burning, or herbicide treatments.

The term manipulation does not include the distributing or scattering of grain, seed, or other feed after removal from or storage on the field where grown.

Natural vegetation is defined as any nonagricultural, native, or naturalized plant species that grows at a site in response to planting or from existing seeds or other propagules. The term natural vegetation does not include planted millet. However, planted millet that grows on its own in subsequent years after the year of planting is considered natural vegetation.

According to the Migratory Bird Treaty Act, you can hunt doves in fields where grain has been distributed or scattered solely as the result of a normal agricultural operation. A normal agricultural operation includes normal agricultural plantings, harvestings, or post-harvest manipulations as well as other normal agricultural practices if they are conducted in accordance with recommendations of State Extension Specialists of the Cooperative State Research, Education, and Extension Service.

You can also hunt doves over lands planted using top sowing or aerial seeding where seeds have been scattered solely as the result of a normal agricultural planting or a normal soil stabilization practice.

Planted seeds and grains that have not sprouted are very attractive to doves. Lands planted using top-sowing or aerial seeding can be hunted where seeds are present solely as the result of a normal agricultural planting or normal soil stabilization practice. A normal agricultural planting is a planting undertaken for the purpose of producing or gathering a crop.

Normal plantings do not involve the placement of grain in piles or other concentrations. Plantings must follow Cooperative State Research, Education, and Extension Service recommendations. Relevant factors include recommended planting dates, proper seed distribution, seed bed preparation, application rate, and seed viability.

A normal soil stabilization practice is a planting for agricultural soil erosion control or post-mining land reclamation conducted in accordance with recommendations of State Extension Specialists. The planting of wildlife food plots is considered a normal agricultural operation in many areas of the country. In many states, State Extension Specialists provide recommendations for the planting of wildlife food plots. Doves may be hunted over wildlife food plots planted in accordance with these recommendations. In those states where the Cooperative State Research, Education, and Extension Service does not issue recommendations for the planting of wildlife food plots, doves may be hunted over these plots where seed has been planted in a manner consistent with the guidelines for producing a crop. However, seeds freshly planted or otherwise distributed for the purpose of luring, attracting, or enticing doves within gun range will be considered baiting. To avoid any question, planting of wildlife food plots should occur early enough to allow time for the seeds to germinate.

You may hunt doves over manipulated grain crops, such as corn, wheat, milo, sorghum, millet, sunflower, and buckwheat.

Recall, the term manipulation does not include distributing or scattering of grain, seed, or other feed after removal from or storage on the field where grown; and threshing is to separate the grain or seeds from (a cereal plant or the like) by some mechanical means.

SUMMARY OF THE INVENTION

Broadly, the present invention is a cutting and threshing blade for a bush hog, wherein when the bush hog is fitted with the cutting and threshing blades, wherein when bush hogging seeds and grains are loosened from their growth carrier, making the crop a more palatable source of food for game birds in general, and doves in particular. Using the cutting and threshing blade, potentially, the seeds and grains of a crop could be stored in the field, and then, in situ, threshed from their growth carrier.

A first object of the invention is that there is a synergistic juxta-positioning of a rotating knife edge and a threshing block, which is a steel elongate block, transforming a bush hog from a cutting processor to a cutting and threshing processor, wherein the blades strike growth carriers (i.e.; cob, husk) which are housing corn, wheat, milo, sorghum, millet, sunflower, or buckwheat with enough force that the seeds, grains, or kernels are released.

These and other objects and advantages of the present invention will be readily appreciable from the following description of preferred embodiments of the invention and from the accompanying drawings and claims.

BRIEF DESCRIPTION OF THE DRAWINGS

The foregoing invention will become readily apparent by referring to the following descriptions and the appended drawings in which.

DETAILED DESCRIPTION OF THE INVENTION

Figure 1:
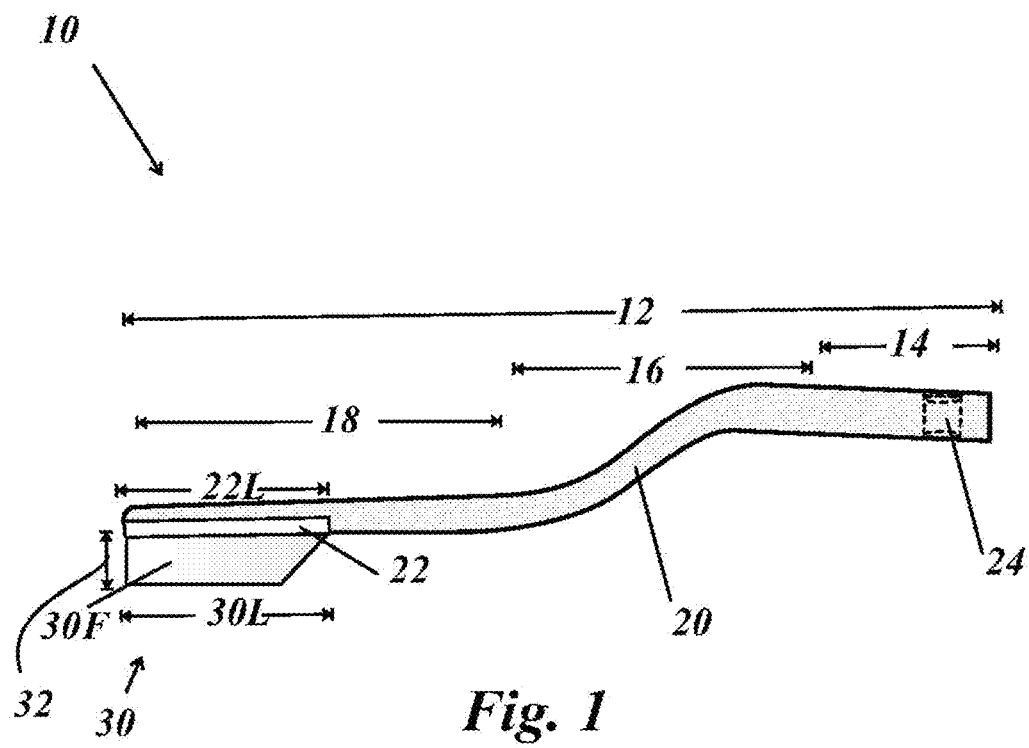
FIG. 1 is a side view illustrating a leading edge of a cutting and threshing blade for a bush hog, wherein a hole for attaching the blade is indicated with dashed lines.

Illustrative embodiments and exemplary applications will be described with reference to the accompanying drawings to disclose the advantageous teachings of the present invention.

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather, these embodiments are provided so that this disclosure will satisfy applicable legal requirements. Those having ordinary skill in the art and access to the teachings provided herein will recognize addition.

The invention includes a pair of modified bush hog cutting blades, wherein each blade has a threshing element that includes a threshing block, which is a steel elongate block, on an underside of the blade. The threshing block is usually about as long as the knife edge of the blade.

The threshing block is typically welded and reinforced, or alternatively, formed when the blade is formed. The modified blade not only cuts, but threshes the crop separating the seeds from the growth carriers. A bush hog fitted with the cutting and threshing blades separates seeds and grains from growth carriers, therein making the seeds and grains a more palatable food source for game birds in general, and doves in particular. Using the cutting and threshing blade, potentially, the seeds and grains of a crop could be stored in the field, and then, in situ, threshed from their growth carrier.

As will become apparent in the drawings, the cutting and threshing blade is broadly speaking derived from a nearly flat bar that has a bottom-side (ground side), an upper-side, an overall length, a width, and a thickness. The flat bar typically has a medial short portion contiguous with a transitional curvilinear portion that is contiguous with an elongate distal portion. The medial short portion has a hole for pivotally attaching the blade to a bush hog's pan weldment, which is commonly referred to as the stump jumper. The bush hog's stump jumper is reinforced by a rotor, and typically a pair of blades, separated by 180 degrees of rotation, are fastened to the rotor on opposing ends of the rotor, wherein the rotor is attached to the spindle, and the stump jumper functions as a protective shield.

The elongate distal portion and the medial short portion are coplanar and the transitional curvilinear portion provides an offset between the medial short portion and the elongate distal portion, wherein the offset is determined by a shape of the transitional curvilinear portion. If there is substantially no offset, and the medial short portion and the elongate distal portion are planar, then the transitional curvilinear portion is substantially straight.

The cutting and threshing blade typically has a trailing edge and a rounded/beveled leading edge. At least a third of the leading edge of the upper-side of the elongate distal portion of the blade has a knife edge having a knife length, which thickens toward the trailing edge, and is primarily on an upper-side of the elongate distal portion. The trailing edge can have an upward air deflector. The bottom-side of the elongate distal portion has a threshing block, which is a steel elongate block, having a block length that is comparable to the knife length and projects downward and juxta-positionally aligned, yet setback from the knife edge.

In one embodiment, the threshing block converts the bush hog blade to a cutting and threshing blade. The threshing block has a block height sufficient to extend beneath and downward 3 to 7 times the thickness of the blade. An inboard wall of the thick steel block is tapered at about 45 degrees from perpendicular. An outboard wall of the thick steel block is about perpendicular with the distal end of the elongate distal portion.

The threshing block has a front-side and a backside. The back side typically has reinforcing bars that buttress the thick steel block. Two reinforcing bars are nominal. The threshing block and the reinforcing bars, taken together function as a threshing element, and are either welded to the blade or formed in the blade when it is formed.

The added weight of the threshing block protruding below, juxta-positionally parallel to the knife edge adds momentum, so that when the combination of the rotating knife edge and the threshing block impacts the growth carrier (i.e.; cob, husk) for the corn, wheat, milo, sorghum, millet, sunflower, and buckwheat there is enough force that the seeds, grains, and kernels are released. The synergistic juxta-positioning of the rotating knife edge and the threshing block transforms the bush hogging process from cutting to cutting and threshing.

A single spindle bush hog typically has one gearbox assembly, which turns the spindle, which turns two blades counterclockwise as viewed from the deck. A twin spindle bush hog (not shown) has a transfer gearbox assembly, which turns two gearbox assemblies. A first spindle typically turns two blades counterclockwise, and the second spindle turns the other two blades clockwise. There is no limitation on how many pairs of cutting and threshing blades can be utilized in each bush hog or assemblies of bush hogs.

The figures illustrate the invention. As shown in FIG. 1, the cutting and threshing blade 10 is substantially a nearly flat bar that has an bottom-side 10b as numbered and shown in FIG. 4, an upper-side 10u as numbered and shown in FIG. 3, an overall length 12, a width 10w as numbered and shown in FIG. 3, and a thickness 10t as numbered and shown in FIG. 2.

The nearly flat bar has a medial short portion 14 that is contiguous with a transitional curvilinear portion 16 that is contiguous with an elongate distal portion 18. As shown in the side view of FIG. 1 the blade 10 has a leading edge 20 wherein the elongate distal portion 18 has a knife edge 22 with a knife length 22L that is at least one third the length of the elongate distal portion 18. A hole 24 for connecting the blade to the bush hog is indicated with dashed lines. The bush hog 100 is shown FIG. 10 and FIG. 11. The bottom-side of the elongate distal portion has a threshing block 30, which is a steel elongate block, that is thick and has a block length 30L that is comparable to the knife length 22L. The threshing block 30 projects downward, having a height 32 that is about 2 to 6 inches, and it is juxta-positionally aligned with and setback from the knife edge 22. In this figure, FIG. 1, the front side 30F of the block is visible.

Figure 2:
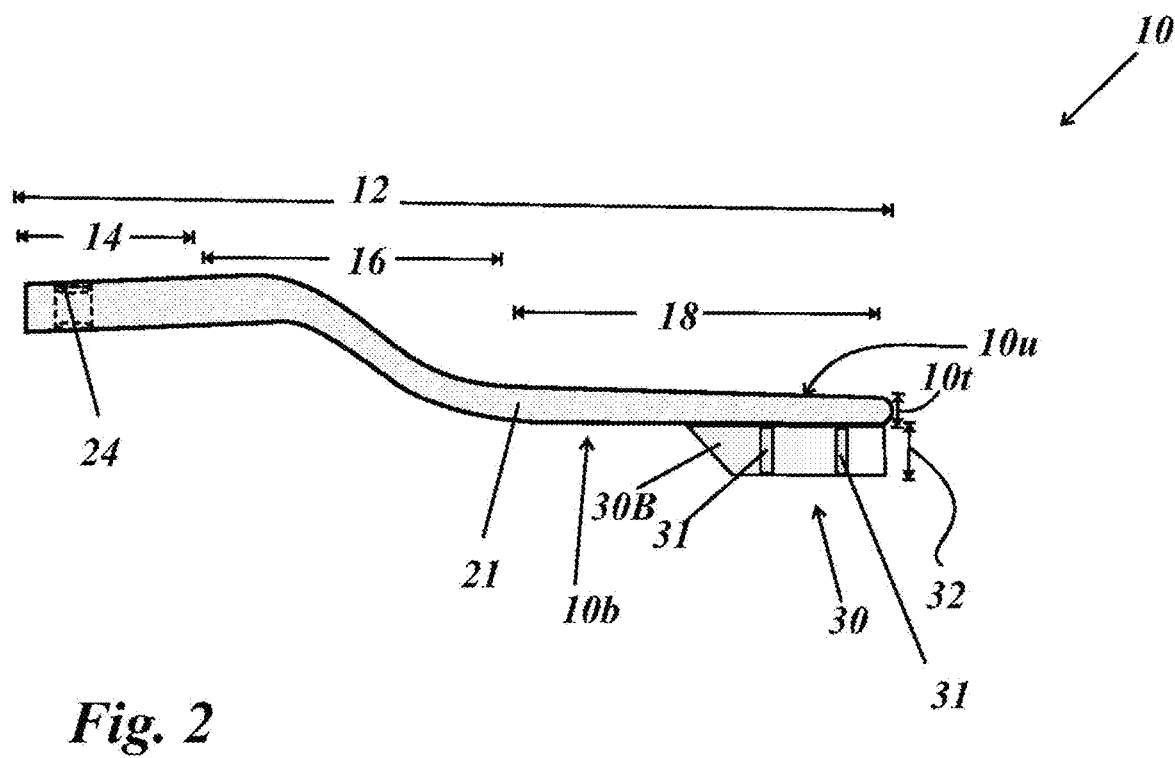
FIG. 2 is a side view illustrating a trailing edge of the cutting and threshing blade for the bush hog as shown in FIG. 1.

The rear of the cutting and threshing blade 10 for a bush hog as shown in FIG. 1 is shown in FIG. 2. The blade 10 has a trailing edge 21. The backside 32B of the threshing block 30 has a pair of reinforcing bars 31. The front side 30F is an impact side during the threshing process.

The threshing elements includes the threshing block and the reinforcing bars 31 are either welded to an existing bush hog blade 10, or the cutting and threshing blade 10 for a bush hog can be formed as a contiguous steel blade having a cutting and threshing elements.

Figure 3:
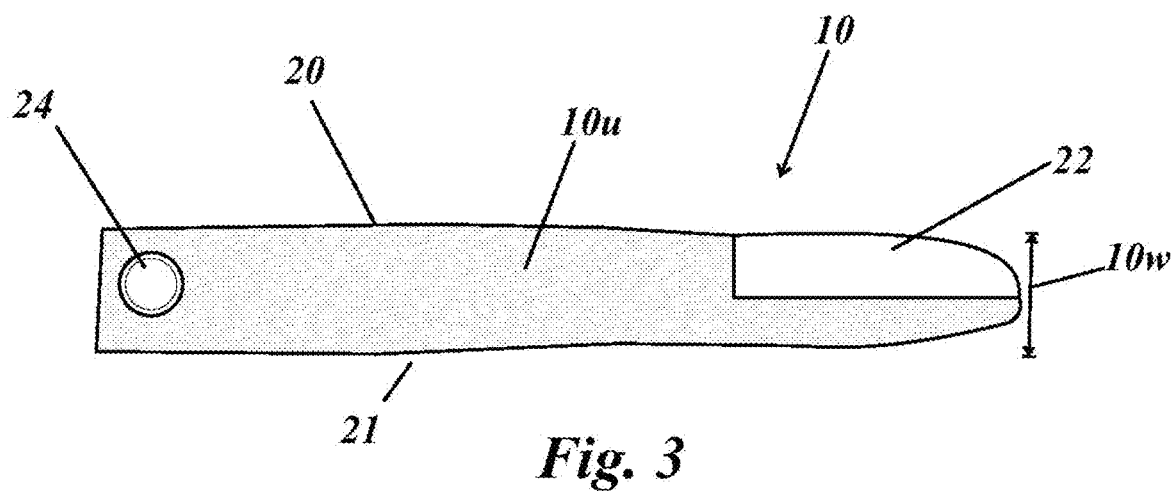
FIG. 3 is a top planar view of the cutting and threshing blade shown in FIG. 2.

A top planar view of the cutting and threshing blade 10 is shown in FIG. 3. The hole 24 for connecting the blade 10 is clearly shown, as is the leading edge with the knife 22, the upper side 10u, the width of the blade 10w, and the trailing edge 21. Note, that in the current illustrated version the distal end of the elongate distal portion is somewhat rounded. Many bush hog blades are not rounded, and this is merely an illustrating embodiment. In other suitable blades the distal end of the elongate distal portion is not rounded.

Figure 5:
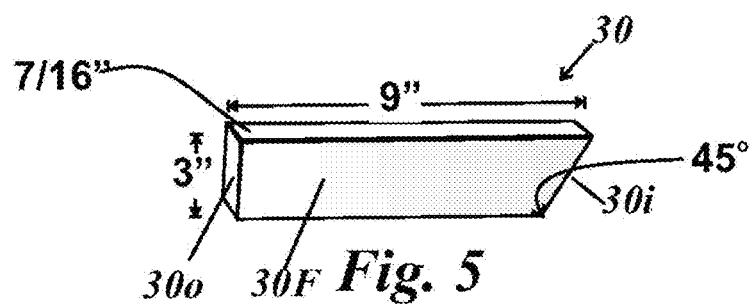
FIG. 5 is a side view of an unattached threshing block illustrated in FIG. 1, prior to being welded to the bottom side of a conventional bush hog blade.
Figure 4:
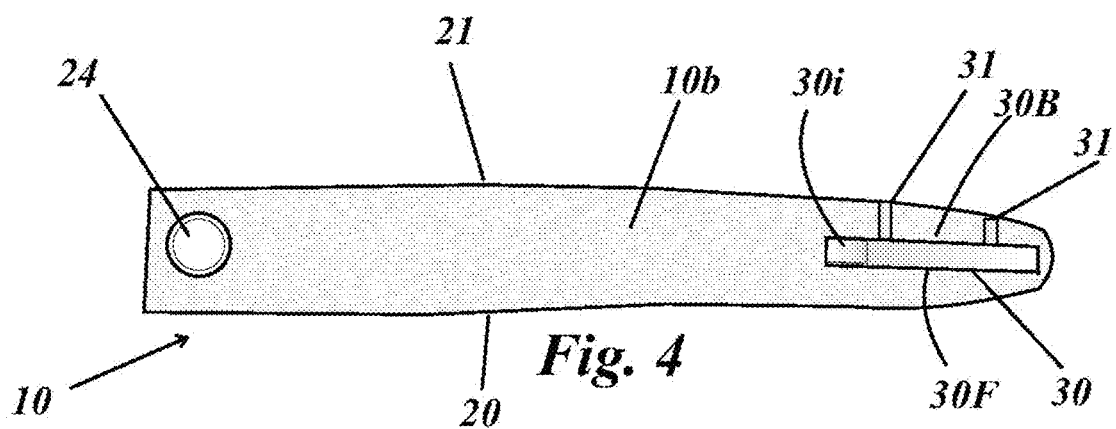
FIG. 4 is a bottom planar view of the cutting and threshing blade shown in FIG. 2.

Before going to FIG. 4, a closer examination of the threshing element 30 is appropriate, and the reader's attention is directed to FIG. 5 and FIG. 1. Note that the threshing block is substantially rectangular, having a length 30L of about 9 inches, a height of about 3 inches, wherein the outboard end of the block 30o is perpendicular, and an inboard end of the block 30i is sloped. The length at its lowest point is about 8 inches. The length of the sloped inboard end of the block 30i is about 4 inches. The inboard end is sloped/tapered about 45 degrees.

Figure 6:
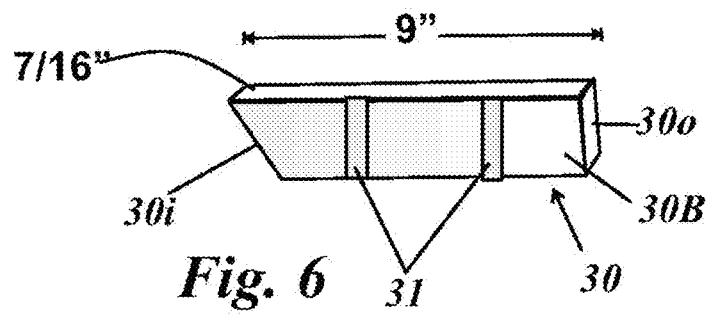
FIG. 6 is a side view of an isolate threshing block and reinforcing bars that buttress the threshing block illustrated in FIG. 2, prior to being welded to the bottom side of a conventional bush hog blade.

Rotating the threshing block into the page shows the back side of the block and the reinforcing bars 31 as shown in FIG. 6. As shown in FIG. 4 the inboard end 30i can be easily seen. The thickness of the threshing block is substantially uniform, and is about 7/16 inches thick or thicker, and the block 30 is positioned midway between the leading edge and the trailing edge and very close to the end of the blade 30.

Figure 7:
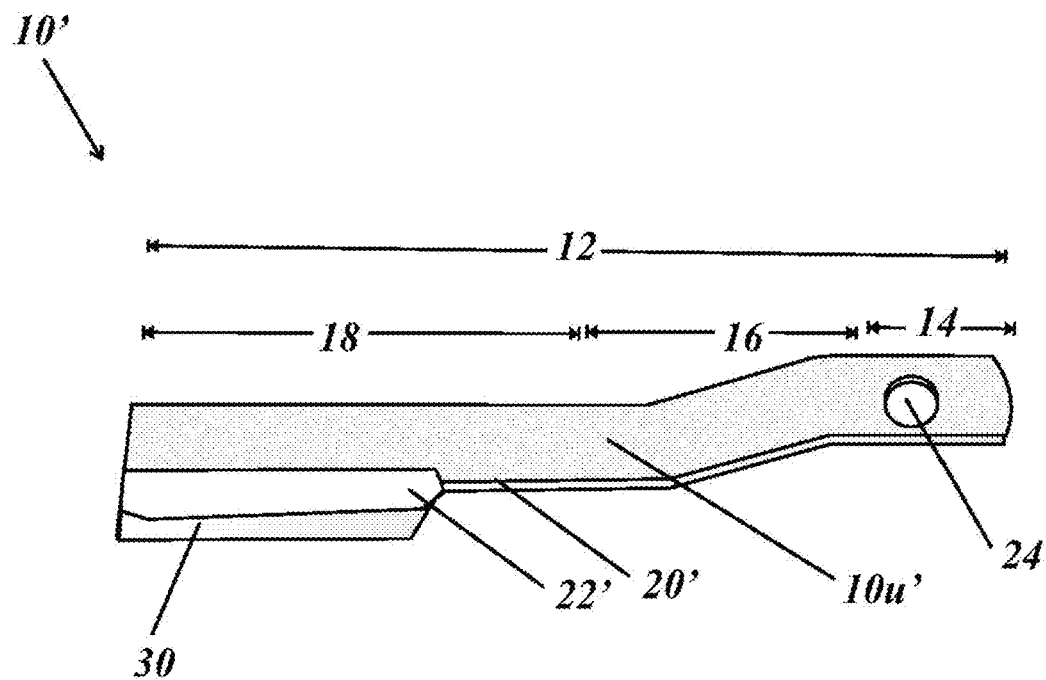
FIG. 7 is an elevated planar view illustrating a bush hog blade having a protruding knife edge that has been modified to include a threshing block as shown in FIG. 5.
Figure 8:
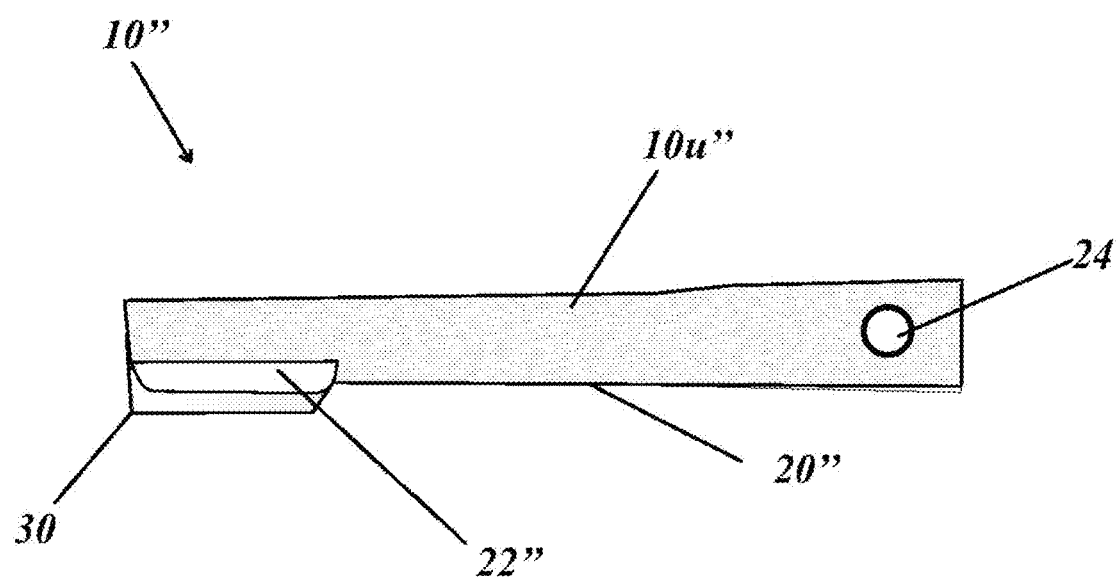
FIG. 8 is an elevated planar view illustrating a substantially straight bush hog blade, having little of no offset and a slightly protruding knife edge, which has been modified to include a threshing block as shown in FIG. 5.

A bush hog blade 10' having a protruding knife edge 22' is modified to include the threshing block 30 as previously described, and is shown in FIG. 7. Like the previous blade 10, it is a substantially flat bar having an overall length 12 consisting of a medial short portion 14 that is contiguous with a transitional curvilinear portion 16 that is contiguous with an elongate distal portion 18. The leading edge 20' is recessed compared to the leading edge 20 of blade 10. The upper-side 10u' is very similar to the upper-side 10u of the cutting and threshing blade 10. Similarly there is a hole 24 for connecting the blade to the bush hog.

A substantially straight bush hog blade 10", having little of no offset and a slightly protruding knife edge 22", has been modified to include a threshing block 30. The threshing block extends to the distal end of the elongate distal section. Unlike blade 10, which had a slightly curved end the distal end of the elongate distal section for blade 10' and both 10" is substantially straight. The upper side 10u" has very little curvilinear form, and therefore the leading edge 20" has very little curvature.

Figures 9, 9A:
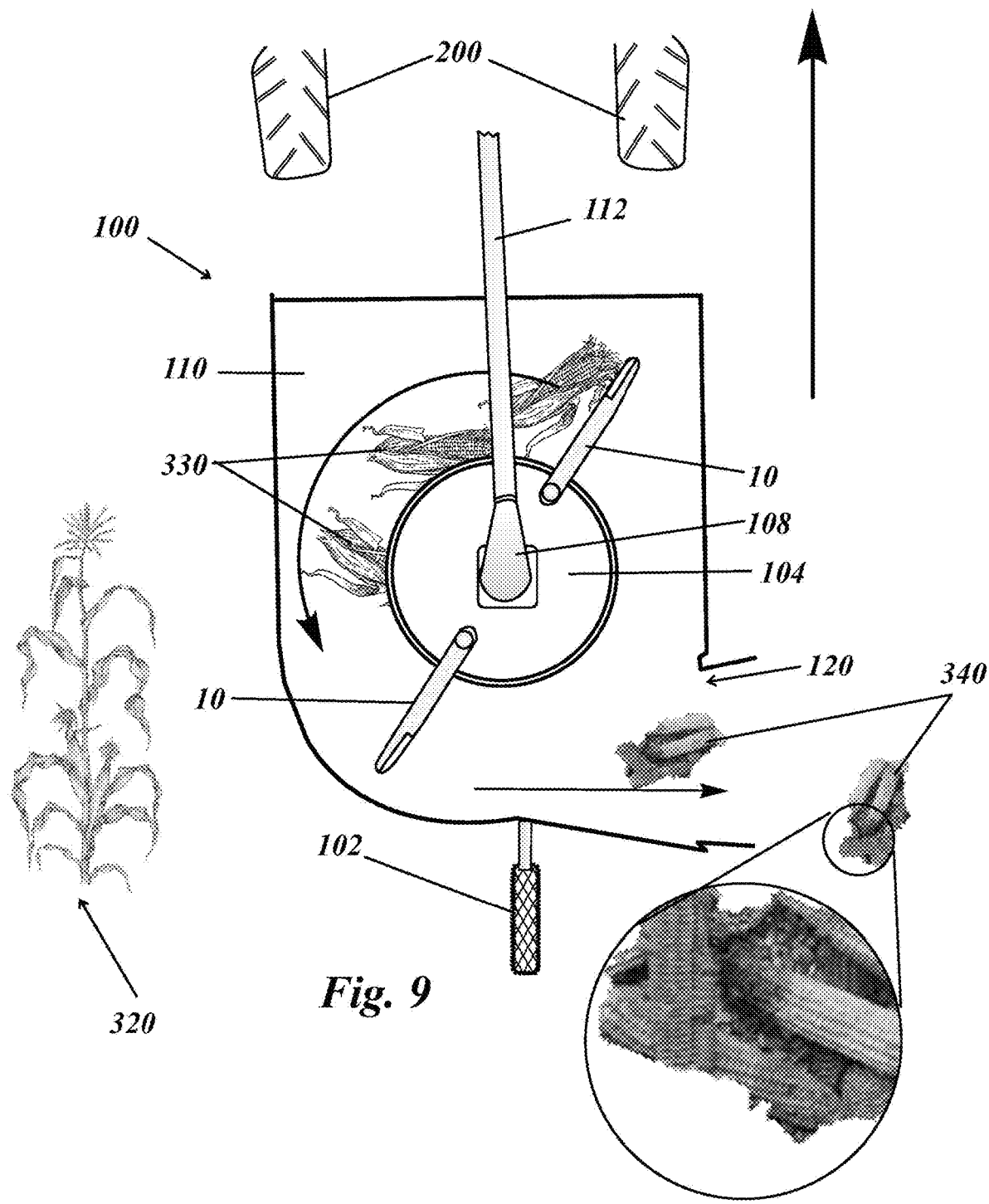
FIG. 9 is a diagrammatic illustration of a pair of cutting and threshing blades fitted on a side discharge bush hog, wherein when the blade hits a growth carrier, such as a cob or husk that is housing corn, wheat, milo, sorghum, millet, sunflower, and buckwheat, it hits the growth carrier with enough force that the seeds, grains, and kernels are released, therein making the crop a more palatable source of food for game birds in general, and doves in particular.
FIG. 9a is a magnified view of a portion of a threshed crop after it has been processed by a bush hog fitted with a pair of cutting and threshing blades, illustrating that the seeds and grains are loose.

FIG. 9 is a diagrammatic illustration of a pair of cutting and threshing blades 10 fitted on a bush hog 100 with a side discharge 129, wherein when the blade hits a growth carrier (i.e.; cob, husk) for the corn, wheat, milo, sorghum, millet, sunflower, and buckwheat with enough force that the seeds, grains, and kernels are released. The synergistic juxta-positioning of the rotating knife edge and the threshing block transforms the process from just cutting to cutting and threshing. In the illustration, the bush hog 100 is being pulled a tractor 200. The bush hog has a deck 110, a rear wheel 102, a gear assembly 108, a stump jumper 104, and is a drive line assembly 112.

The illustrated crop is corn 320. As the bush hog travels over the crop, the deck pushes down corn, and the ears of corn are simultaneously cut and pummeled by the rotating blades. The ears are hit with enough force that the seeds, grains, and kernels are released and discharged, therein making the crop a more palatable food source for game birds in general, and doves in particular.

FIG. 9a is a magnified view of the crop product after it has been discharged by the bush hog. The threshed seeds, kernels, and grains are loose, and the remaining cobs (e.g. growth carriers) are substantially barren.

Figure 10:
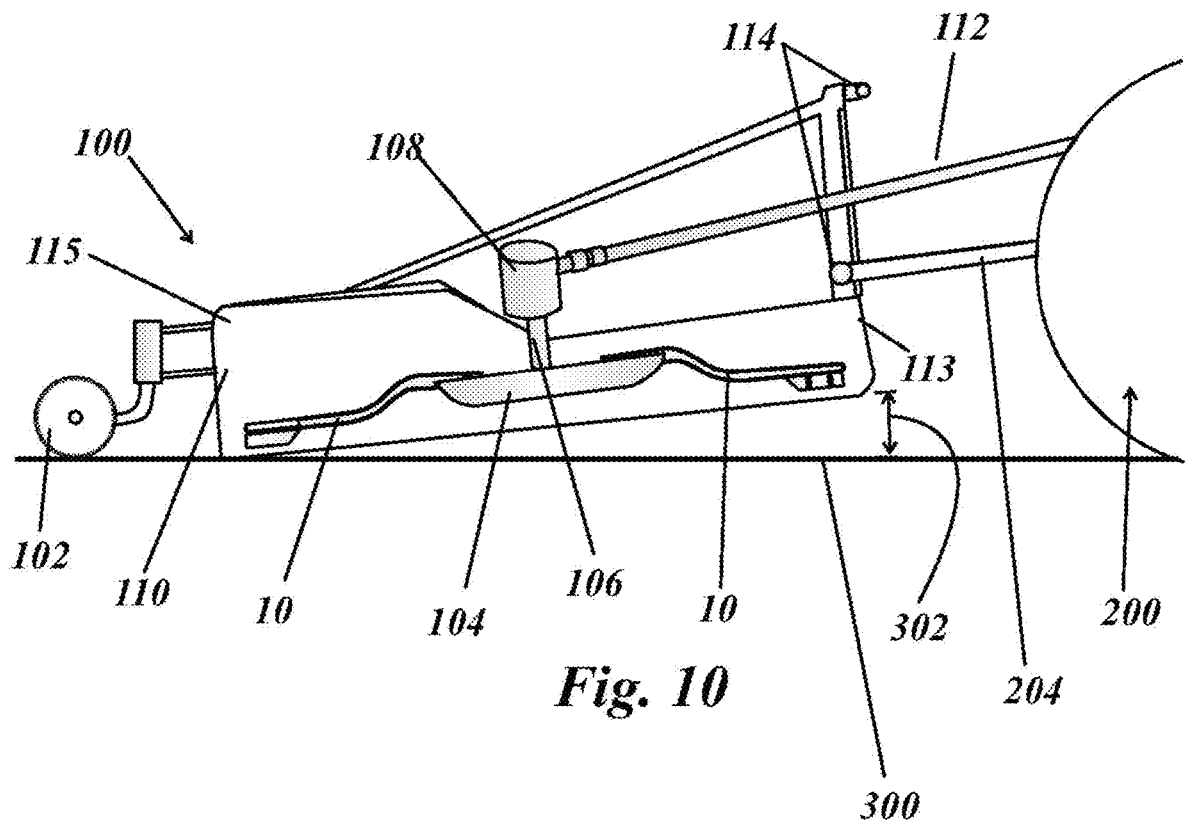
FIG. 10 is a cut away illustration of a side discharge bush hog pulled by a three point hitch tractor, wherein a front of the bush hog is lifted, tilting its backwards further lowering the distal ends of the cutting and threshing blades, therein increasing contact with crop growth carriers that are laying on the ground.

FIG. 10 is a cut away illustration of a side discharge bush hog 100 pulled by a three point hitch tractor 200, wherein a front 113 of the bush hog is lifted 302 several inches above the ground 300 using connecting points 114 and a connecting strut 204, tilting the bush hog backwards further lowering the distal ends of the cutting and threshing blades 10, therein increasing contact with crop that is laying on the ground 300. The gear assembly 108, powered by the drive assembly 112, turns the spindle 106, which turns a rotor (see 105 in FIG. 11) which turns the stump jumper 104 and the blades 10. There is a rear wheel 102 attached to the rear of the deck 115.

Figure 11:
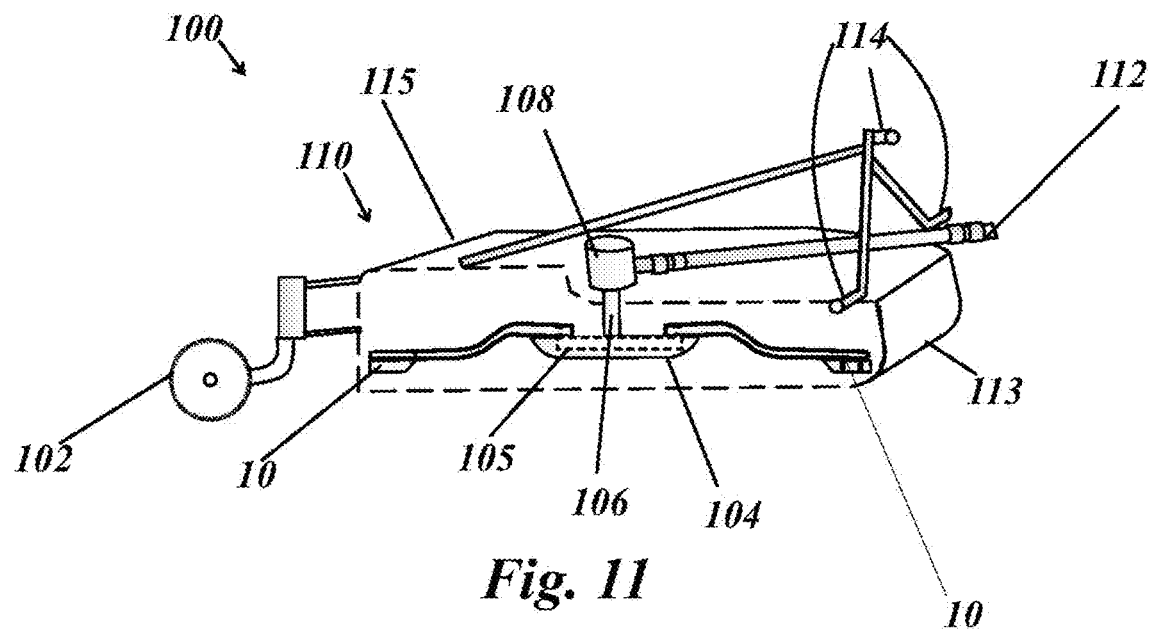
FIG. 11 is a cut away illustration of a bush hog fitted with a pair of cutting and threshing blades illustrating the gear box, the stump jumper, the power shaft and in dashed lines, a rotor that conveys power from the spindle to the blades and the stump jumper.

In FIG. 11, the bush hog 100 is not connected to a tractor. The deck 110 is partially cut away, indicated by the dashed lines, allowing the reader to see the blades. The connecting points 114 are unconnected.

Figure 12:
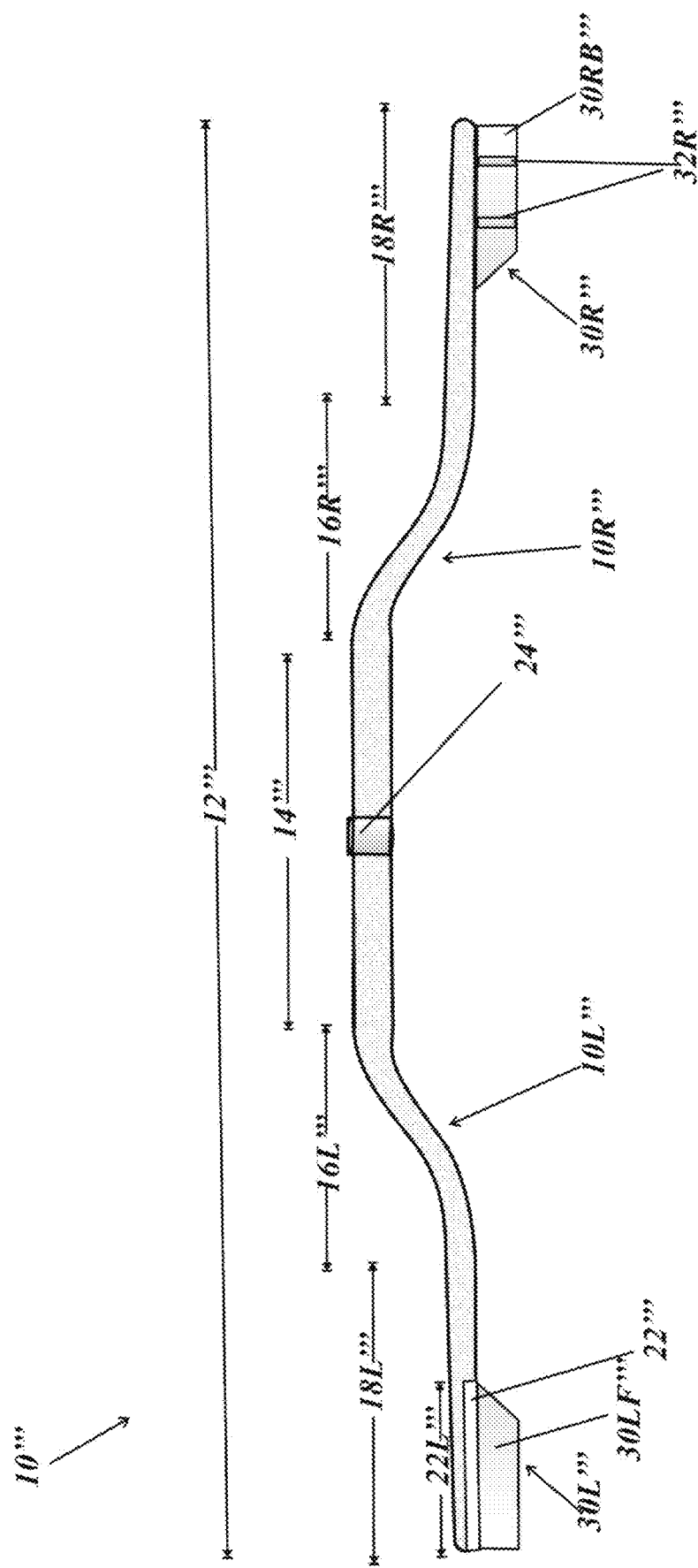
FIG. 12 is a side view of a non-pivoting cutting and threshing blade for a bush hog or a mower, wherein both ends of the blade have a cutting length and a threshing block.

FIG. 12 illustrates a cutting and threshing blade 10''' a cutting and threshing blade for a bush hog or a mower, wherein said cutting and threshing blade that has an about flat bar of steel that has a bottom-side (ground side), an upper-side, an overall length 12''', a width, and a thickness. The blade has a center portion 14''' that is contiguous with a left transitional curvilinear portion 16L''' that is contiguous with a left elongate distal portion 18L''', and is also contiguous with a right transitional curvilinear portion 16R''' that is contiguous with a right elongate distal portion 18R'''.

The center portion 14''' has at least one mounting element 24''' for directly or indirectly attaching the blade to a shaft. The left elongate distal portion 18L''' and the right elongate distal portion 18R''' are about coplanar and symmetrically offset from the center portion 14'''. The amount of offset is determined by the shape of the left transitional curvilinear portion 10L''' and the shape of the right transitional curvilinear portion 10R'''. The left elongate distal portion and the right elongate distal portion respectfully have a left leading edge, a left trailing edge, a right leading edge, and a right trailing edge, where at least a third of the left leading edge has a left knife edge 22''' with a left knife length 22L''' that thickens toward the left trailing edge. At least a third of the right leading edge also has a right knife edge with a right knife length that thickens toward the right trailing edge, but is not visible in FIG. 12.

The threshing element includes a left threshing block 30L''' and a right threshing block 30R''', which are both steel elongate blocks of about the same weight and dimensions, and located, respectfully, on the bottom-side of the left elongate distal portion 18L''' and the right elongate distal portion 18R''', wherein the left threshing block 30L''' and the right threshing block 30R''' each have a block length that is comparable to the left knife length 22L'' and right knife length (not visible). Each of the respective left and right threshing blocks has a block height sufficient to extend beneath the bottom-side of the left and right elongate distal portions downward 3 to 7 times the thickness of the about flat bar of steel.

The inboard walls of both the left and right threshing blocks are tapered at about 45 degrees and outboard walls are about perpendicular to the upper-side of the respective left and right distal ends of the respective left and right elongate distal portions.

The respective left and right threshing blocks, being below and behind the respective left 22''' and right (not visible) cutting edges, add weight increasing momentum and surface area, so that when the cutting and threshing blade impacts a growth carrier that is bearing seeds, grains, and kernels, it pummels the growth carrier with enough force that the seeds, grains, and kernels are released; and The synergistic juxta-positioning of the respective left 22''' and right (not visible) knife edges with the respective left and right threshing blocks 30L''', 30R''' transforms bush hogging and mowing from a cutting process to cutting and threshing process.

The threshing element further includes at least one reinforcing bar 32L''' (not visible), 32R''' for the left threshing block and for the right threshing block. Each of the respective left and right threshing blocks 30L''', 30R''' has a front-side and a backside. The front side 30LF''' of the left threshing block is shown and the backside 30RB''' of the right threshing block is shown in FIG. 12. The at least one reinforcing bar (as shown for the right side 32R''') is affixed to the bottom-side of the elongate distal portion and the backside of each of the respective left and right threshing blocks therein buttressing the front-side 30LF''', 30RF'''(not visible), which is impacted during the threshing process.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A cutting and threshing blade for use on a bush hog, wherein said cutting and threshing blade comprises:
   a bar of steel that has a bottom-side (ground side), an upper-side, an overall length, a width, and a thickness, wherein the bar has a medial short portion contiguous with a transitional curvilinear portion that is contiguous with an elongate distal portion;
   said medial short portion having a hole for attaching the blade to a bush hog's rotor forming an attachment that allows pivotal rotation of the blade on the bush hog's rotor;
   said elongate distal portion and the medial short portion are approximately parallel and coplanar with an offset that is determined by a shape of the transitional curvilinear portion;
   said elongate distal portion has a leading edge and a trailing edge and, where at least a third of the leading edge has a knife edge with a knife length that thickens toward the trailing edge;

a threshing element comprising a threshing block, which is a steel elongate block, on the bottom-side of the elongate distal portion, said steel elongate block having a block length that is comparable in length to the knife length, wherein said threshing block has a block height sufficient to extend beneath the bottom-side of the elongate distal portion and downward 3 to 7 times the thickness of the about flat bar of steel, wherein an inboard wall of said threshing block is tapered at about 45 degrees and an outboard wall that is about perpendicular to the upper-side of the distal end of the elongate distal portion;

said threshing block, being below and behind the cutting edge adds weight increasing momentum and surface area, Go that when the cutting and threshing blade impacts a growth carrier that is bearing seeds, grains, and kernels, the threshing block pummels the growth carrier with enough force that the seeds, grains, and kernels are released; and a synergistic juxta-positioning of the knife edge with said threshing block transforms bush hogging from a cutting process to a cutting and threshing process.

2. The cutting and threshing blade according to claim 1, wherein the threshing element further comprises at least one reinforcing bar for said threshing block, wherein said threshing block has a front-side and a backside, and the at least one reinforcing bar is affixed to the bottom-side of the elongate distal portion and the backside of said threshing block therein buttressing the front-side, which is impacted during the threshing process.

3. The cutting and threshing blade according to claim 1, wherein the threshing element is added to an existing bush hog blade.

4. The cutting and threshing blade according to claim 2, wherein the threshing element is added to an existing bush hog blade.

5. The cutting and threshing blade according to claim 1, wherein the cutting and threshing blade is formed as a contiguous element.

6. The cutting and threshing blade according to claim 1, wherein said threshing block has a block thickness that is about uniform, and is about 7/16 inches thick.

7. A cutting and threshing blade for use on a bush hog, wherein said cutting and threshing blade comprises:

a bar of steel that has a bottom-side (ground side), an upper-side, an overall length, a width, and a thickness, wherein the bar has a medial short portion contiguous with a transitional curvilinear portion that is contiguous with an elongate distal portion;

said medial short portion having a hole for attaching the blade to a bush hog's rotor forming an attachment that allows pivotal rotation of the blade on the bush hog's rotor;

said elongate distal portion and the medial short portion are approximately parallel and about coplanar and the transitional curvilinear portion contains curved sections and a straight section;

said elongate distal portion has a leading edge and a trailing edge and, where at least a third of the leading edge has a protruding knife edge with a knife length that thickens toward the trailing edge;

a threshing element comprising a threshing block, which is a steel elongate block, on the bottom-side of the elongate distal portion, said threshing block having a block length that is comparable in length to the knife length, wherein said threshing block has a block height sufficient to extend beneath the bottom-side of the elongate distal portion and downward 3 to 7 times the thickness of the bar of steel, wherein an inboard wall of said threshing block is tapered at about 45 degrees and an outboard wall that is about perpendicular to the upper-side of the distal end of the elongate distal portion;

said threshing block, being below and behind the cutting edge adds weight increasing momentum and surface area, when the cutting and threshing blade impacts a growth carrier that is bearing seeds, grains, and kernels, the threshing block pummels the growth carrier with enough force that the seeds, grains, and kernels are released; and a synergistic juxta-positioning of the knife edge with the threshing block transforms bush hogging from a cutting process to a cutting and threshing process.

8. The cutting and threshing blade according to claim 7, wherein the threshing element further comprises at least one reinforcing bar for said steel elongate block, wherein said threshing block has a front-side and a backside, and the at least one reinforcing bar is affixed to the bottom-side of the elongate distal portion and the backside of said threshing block therein buttressing the front-side, which is impacted during the threshing process.

9. The cutting and threshing blade according to claim 7, wherein the threshing element is added to an existing bush hog blade.

10. The cutting and threshing blade according to claim 8, wherein the threshing element is added to an existing bush hog blade.

11. The cutting and threshing blade according to claim 7, wherein the cutting and threshing blade is formed as a contiguous element.

12. The cutting and threshing blade according to claim 7, wherein said threshing block has a block thickness that is about uniform, and is about 7/16 inches thick.

13. A cutting and threshing blade for use on a bush hog or a mower, wherein said cutting and threshing blade comprises:

a bar of steel that has a bottom-side (ground side), an upper-side, an overall length, a width, and a thickness, wherein the flat bar has a center portion that is contiguous with a left transitional curvilinear portion contiguous with a left elongate distal portion, and is also contiguous with a right transitional curvilinear portion contiguous with a right elongate distal portion;

wherein the center portion has at least one mounting element for directly or indirectly attaching the blade to a shaft;

wherein the left elongate distal portion and the right elongate distal portion are approximately parallel and coplanar and symmetrically offset from with the center portion, wherein an amount of offset is determined by a shape of the left transitional curvilinear portion and the right transitional curvilinear portion;

wherein the left elongate distal portion and the right elongate distal portion respectfully have a left leading edge, a left trailing edge, a right leading edge, and a right trailing edge, where at least a third of the left leading edge has a left knife edge with a left knife length that thickens toward the left trailing edge, and where at least a third of the right leading edge has a right knife edge with a right knife length that thickens toward the right trailing edge;

a threshing element comprising a left threshing block and a right threshing block, which are both steel elongate blocks of about the same weight and dimensions, and located, respectfully, on the bottom-side of the left elongate distal portion and the right elongate distal portion, wherein the left threshing block and the right threshing block each have a block length that is comparable in length to the left knife length and right knife length, wherein each of the respective left and right threshing blocks has a block height sufficient to extend beneath the bottom-side of the left and right elongate distal portions downward 3 to 7 times the thickness of the bar of steel, wherein inboard walls of both the left and right threshing blocks are tapered at about 45 degrees and outboard walls are about perpendicular to the upper-side of the respective left and right distal ends of the respective left and right elongate distal portions; said respective left and right threshing blocks, being below and behind the respective left and right cutting edges, add weight increasing momentum and surface area, when the cutting and threshing blade impacts a growth carrier that is bearing seeds, grains, and kernels, the threshing blocks pummel the growth carrier with enough force that the seeds, grains, and kernels are released; and a synergistic juxta-positioning of the respective left and right knife edges with the respective left and right threshing blocks transforms bush hogging and mowing from a cutting process to a cutting and threshing process.

14. The cutting and threshing blade according to claim 13, wherein the threshing element further comprises at least one reinforcing bar for both the left threshing block and for the right threshing block, wherein each of the respective left and right threshing blocks has a front-side and a backside, and the at least one reinforcing bar is affixed to the bottom-side of the elongate distal portion and the backside of each of the respective left and right threshing blocks therein buttressing the front-side, which is impacted during the threshing process.

15. The cutting and threshing blade according to claim 14, wherein the threshing element is added to an existing bush hog blade or an existing mower blade.

16. The cutting and threshing blade according to claim 13, wherein the cutting and threshing blade is formed as a contiguous element.

* * * * *